United States Patent
Jordan et al.

(10) Patent No.: US 12,031,490 B2
(45) Date of Patent: Jul. 9, 2024

(54) SYSTEM AND METHOD FOR NON-MODEL BASED CONTROL UTILIZING TURBINE EXIT MACH NUMBER SURROGATE

(71) Applicant: GENERAL ELECTRIC COMPANY, Schenectady, NY (US)

(72) Inventors: Harold Lamar Jordan, Greenville, SC (US); David Spencer Ewens, Greer, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 147 days.

(21) Appl. No.: 17/479,200

(22) Filed: Sep. 20, 2021

(65) Prior Publication Data

US 2023/0086029 A1    Mar. 23, 2023

(51) Int. Cl.
*F02C 9/20* (2006.01)
*F02C 9/22* (2006.01)

(52) U.S. Cl.
CPC ............ *F02C 9/22* (2013.01); *F05D 2270/01* (2013.01)

(58) Field of Classification Search
None
See application file for complete search history.

(56) References Cited

U.S. PATENT DOCUMENTS

| | | | |
|---|---|---|---|
| 7,784,288 B2 | 8/2010 | Thatcher et al. | |
| 8,060,340 B2 | 11/2011 | Gao et al. | |
| 2004/0055273 A1* | 3/2004 | Hirayama | F02C 9/32 60/39.281 |
| 2007/0073525 A1 | 3/2007 | Healy et al. | |
| 2012/0290250 A1* | 11/2012 | Snider | F01D 21/003 702/130 |
| 2014/0121935 A1 | 5/2014 | Zhang et al. | |
| 2014/0156165 A1* | 6/2014 | Ewens | F02C 9/00 701/100 |
| 2014/0208764 A1 | 7/2014 | Ekanayake et al. | |
| 2017/0167389 A1 | 6/2017 | Conchieri | |
| 2018/0058334 A1 | 3/2018 | Mathai et al. | |

OTHER PUBLICATIONS

Extended European Search Report for Application No. EP22193165.2, dated Feb. 15, 2023, 8 pgs.

\* cited by examiner

*Primary Examiner* — Gerald L Sung
(74) *Attorney, Agent, or Firm* — Fletcher Yoder, P.C.

(57) ABSTRACT

A system includes a gas turbine system including a compressor, a combustor, a turbine, and an exhaust section. The system also includes multiple sensors coupled to components of the gas turbine system. The system further includes a controller communicatively coupled to the gas turbine system and the multiple sensors and configured to control operations of the gas turbine system, wherein the controller is configured to calculate a surrogate value for turbine exit Mach number based on the feedback from the multiple sensors and to utilize the surrogate value to derive a control action for the gas turbine system.

17 Claims, 5 Drawing Sheets

SYSTEM AND METHOD FOR NON-MODEL BASED CONTROL UTILIZING TURBINE EXIT MACH NUMBER SURROGATE

BACKGROUND

The subject matter disclosed herein relates to gas turbine engines, and more particularly, to systems and methods for controlling the gas turbine engines In general, performance of gas turbine systems may degrade over time. Certain systems, such as an industrial control system, may provide for capabilities that enable the control and analysis of a gas turbine system. For example, the industrial control system may include controllers, field devices, and sensors storing data used in controlling the turbine system. Certain industrial control systems may use modeling for enhancing the industrial control system. For example, model-based controls (e.g., an onboard, real time gas turbine model) may be utilized to calculate parameters for direct boundary control for parameters that are not directly measured. However, certain gas turbine systems may lack these model-based controls. It would be beneficial to provide an alternative control strategy for these gas turbine systems lacking model-based controls to enable these gas turbine systems to run to various boundary constraints at full power to provide maximum performance over a wide range of operating conditions.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system is provided. The system includes a gas turbine system including a compressor, a combustor, a turbine, and an exhaust section. The system also includes multiple sensors coupled to components of the gas turbine system. The system further includes a controller communicatively coupled to the gas turbine system and the multiple sensors and configured to control operations of the gas turbine system, wherein the controller is configured to calculate a surrogate value for turbine exit Mach number based on the feedback from the multiple sensors and to utilize the surrogate value to derive a control action for the gas turbine system.

In accordance with a second embodiment, a method is provided. The method includes receiving, at a controller, feedback from multiple sensors coupled to components of a gas turbine system, the gas turbine system including a compressor, combustor, a turbine, and an exhaust section. The method also includes calculating, via the controller, a surrogate value for turbine exit Mach number based on the feedback from the multiple sensors. The method further includes utilizing, via the controller, the surrogate value to derive a control action for the gas turbine system.

In accordance with a third embodiment, a non-transitory computer-readable medium is provided. The computer-readable medium includes processor-executable code that, when executed by a processor, causes the processor to perform actions. The actions include receiving feedback from multiple sensors coupled to components of a gas turbine system, the gas turbine system including a compressor, combustor, a turbine, and an exhaust section. The method also includes calculating a surrogate value for turbine exit Mach number based on the feedback from the multiple sensors. The method further includes utilizing, via the controller, the surrogate value to derive a control action for the gas turbine system, wherein the surrogate value acts as a boundary control for the gas turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
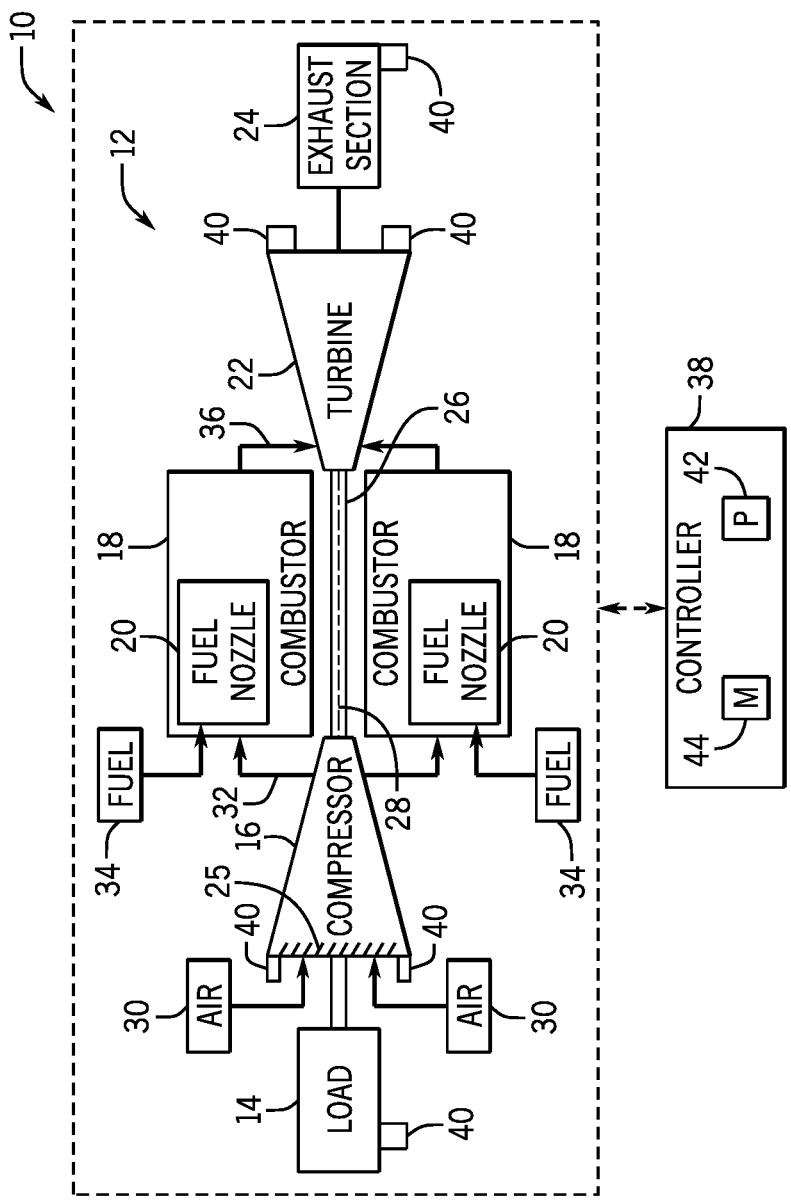
FIG. 1 is a block diagram of a turbine system for which a turbine exit Mn surrogate may be calculated and utilized in controlling the performance of the turbine system, in accordance aspects of the present technique.

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Many current heavy duty gas turbine systems run to various boundary constraints at full power in order to provide maximum performance over a wide range of operating conditions. Typically, a key element to achieving this performance level is the utilization of model-based control (MBC) strategy where a real time model of a gas turbine is embedded (onboard model) in a control system that provides accurate calculations for direct boundary control parameters (e.g., turbine exit Mach number (Mn)). The absence of a MBC strategy, in certain gas turbine systems, hinders the ability to achieve full performance potential.

The present disclosure is directed towards systems and methods that provide an accurate and robust (as well as easily constructed) turbine exit Mn surrogate that may be utilized for limit control on heavy duty gas turbines that do not have MBC control. In certain embodiments, the non-MBC strategy utilizing the turbine exit Mn surrogate may also be utilized on gas turbine systems that have an onboard model where the model lacks any provision for turbine exit Mn control. The turbine exit Mn surrogate is calculated based on feedback (e.g., measured parameters) from sensors within the gas turbine system. These measured parameters (e.g., compressor discharge pressure, exhaust section exit pressure, and exhaust temperature adjusted for radial profile effects) correlate to parameters related to turbine exit corrected flow function (which is strongly correlated to turbine exit Mn) that otherwise would be utilized directly calculate the turbine exit Mn but that are not measured on the gas turbine system (e.g., turbine exit flow, turbine exit total pressure, and turbine exit temperature). The turbine exit Mn surrogate limit level functionally corresponds to an equivalent Mn based on cycle performance with the limit defined in surrogate space. The turbine exit Mn surrogate may be utilized to derive and perform a control action (e.g., on an actuator of inlet guide vane (IGV). The utilization of the turbine exit Mn surrogate may enable hardware upgrades on gas turbine systems that are more cost effective than a full MBC upgrade to support the hardware upgrade.

With the forgoing in mind, FIG. 1 is a block diagram of an embodiment of a turbine system 10 (e.g., gas turbine system) that may use the presently disclosed techniques for calculating a turbine exit Mn surrogate and utilizing the turbine exit Mn surrogate in controlling the performance of the turbine system 10. The illustrated turbine system 10 includes a gas turbine engine 12 coupled to a load 14, such as an electrical generator. The gas turbine engine 12 includes a compressor 16, a plurality of combustors 18 each having at least one fuel nozzle 20, a turbine 22, and an exhaust section 24 (e.g., diffuser section). As illustrated, one or more shafts 26 connect the load 14, compressor 16, and turbine 22. The compressor 16 includes at least one row of inlet guide vanes (IGVs) 25. The compressor 16 and the turbine 22 each include a rotor with blades, which rotate within a stator or shroud. In operation, the compressor 16 receives air 30 and delivers compressed air 32 to the combustors 18 and/or fuel nozzles 20, which then inject fuel 34 (or an air-fuel mixture) into a combustion region in the combustors 18. In turn, the air-fuel mixture combusts in the combustors 18 to produce hot combustion gases 36, which drive blades within the turbine 18. As the turbine 18 is driven to rotate the shaft 26, the compressor 16 is driven to compress the air 16 into the combustors 18 and/or fuel nozzles 20.

Additionally, the illustrated turbine system 10 includes a controller 38 that may generally control the operations of the turbine system 10. For example, in certain embodiments, the controller 38 may be coupled to a number of sensors 40 (e.g., temperature sensors, pressure sensors, flow rate sensors, or other suitable sensors) disposed throughout the gas turbine engine 12. The controller 38 may communicate (e.g., via a network or bus) with the sensors 40 to receive information regarding the turbine engine 12. For example, the controller 38 may communicate with a temperature sensor 40 coupled to the exhaust section 24 of the gas turbine engine 12 to receive a temperature of the exhaust gases (e.g., measured along a control exhaust temperature measurement plane). By further example, a pressure sensor 40 coupled to the compressor 16 may communicate to the controller 38 a compressor discharge pressure. By even further example, a pressure sensor 40 coupled to the exhaust section 24 may communicate to the controller 38 an exhaust pressure at the exit of the exhaust section 24. Furthermore, in certain embodiments, the controller 38 may also communicate with certain components of the turbine system (e.g., the compressor 16, the combustor 18, the turbine 22, intake vanes (e.g., IGVs 25), valves, pumps, actuators, or other suitable components) to control or alter the operation of the gas turbine engine 12. For example, the controller 38 may communicate with the compressor 16 of the gas turbine engine 12 to instruct the field device to open or close an air intake to allow more or less air 30 into the compressor 16. Additionally, the controller 38 may communicate with a fuel actuator on the gas turbine engine 12 to selectively regulate fuel flow, fuel splits, and/or a type of fuel channeled between the fuel supply 34 and the combustors 18. Further, the controller 38 may communicate with additional actuators to adjust a relative position of the IGVs, adjust inlet bleed heat, or activate other control settings on the gas turbine engine 12.

In addition, operations executed by the controller 38 include determining or calculating a surrogate value for the turbine exit Mn based on the feedback from the sensors 40. For example, as described in greater detail below, the surrogate value for the turbine exit Mn may be calculated based on compressor discharge pressure, exhaust section exit pressure, and exhaust temperature adjusted for radial profile effects. The surrogate value for the turbine exit Mn serves as a boundary control or operational limit for the gas turbine engine 12. Operations executed by the controller 38 also include utilizing the surrogate value for the turbine exit Mn to derive a control action for the gas turbine engine 12. In particular, the surrogate value may be utilized as an input to a compressor IGV, closed loop max open effector control constraint.

Furthermore, the controller 38 includes a processor 42 and a memory 44 (e.g., a non-transitory computer-readable medium/memory circuitry) communicatively coupled to the processor 42, storing one or more sets of instructions (e.g., processor-executable instructions) implemented to perform operations related to the gas turbine system 10 in FIG. 1. More specifically, the memory 44 may include volatile memory, such as random-access memory (RAM), and/or non-volatile memory, such as read-only memory (ROM), optical drives, hard disc drives, or solid-state drives. Additionally, the processor 42 may include one or more application specific integrated circuits (ASICs), one or more field programmable gate arrays (FPGAs), one or more general purpose processors, or any combination thereof. Furthermore, the term "processor" is not limited to just those integrated circuits referred to in the art as processors, but broadly refers to computers, processors, microcontrollers, microcomputers, programmable logic controllers, application specific integrated circuits, and other programmable circuits.

Figure 2:
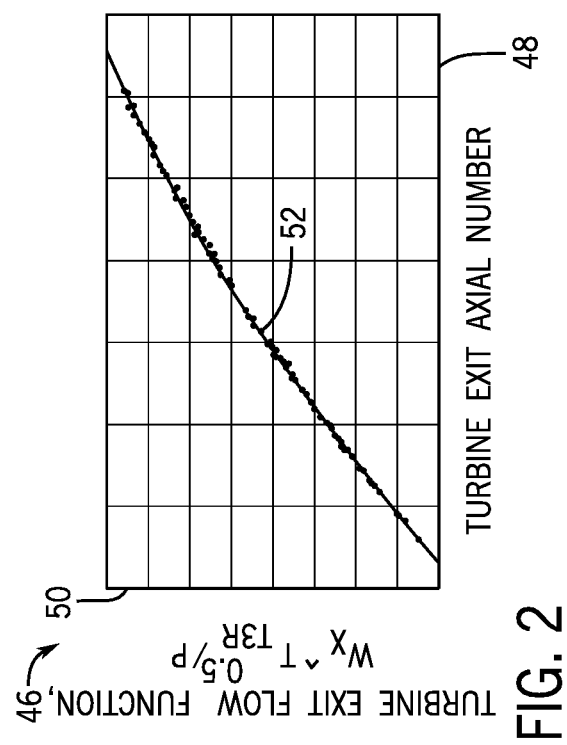
FIG. 2 is a graphical representation of turbine exit flow function to turbine exit Mn, in accordance with aspects of the present technique.

FIG. 2 is a graphical representation 46 of exit flow function to turbine exit Mn. The graphical representation 46 includes an X-axis 48 representing turbine exit axial Mn and a Y-axis 50 representing turbine exit flow function. The turbine exit flow function for a fixed last stage of a turbine of a gas turbine is a function of a flow component ($W_X$) or turbine exit flow, a pressure component ($P_{T3}$) or total pressure, and a temperature component ($T_{T3}$) or total temperature. As shown in plot 52 in the graphical representation 46, the turbine exit flow function is strongly correlated to turbine exit Mn and may serve as turbine exit Mn surrogate in a non-MBC strategy. More specifically, the turbine exit Mn is highly proportional to the product of turbine exit flow and the square root of the turbine exit absolute temperature divided by the turbine exit pressure. In addition, the turbine exit Mn surrogate limit level functionally corresponds to an equivalent Mn based on cycle performance with the limit defined in surrogate space. The turbine exit Mn surrogate is capable of regulating the operating point to a limiting turbine exit Mn at least as well as (if not better) than utilizing the actual turbine exit Mn in a MBC strategy. In particular, the turbine exit Mn surrogate is robust enough to handle variation in ambient conditions, exhaust system design pressure drop variation, component performance variation, and control sensor uncertainty.

Figure 3:
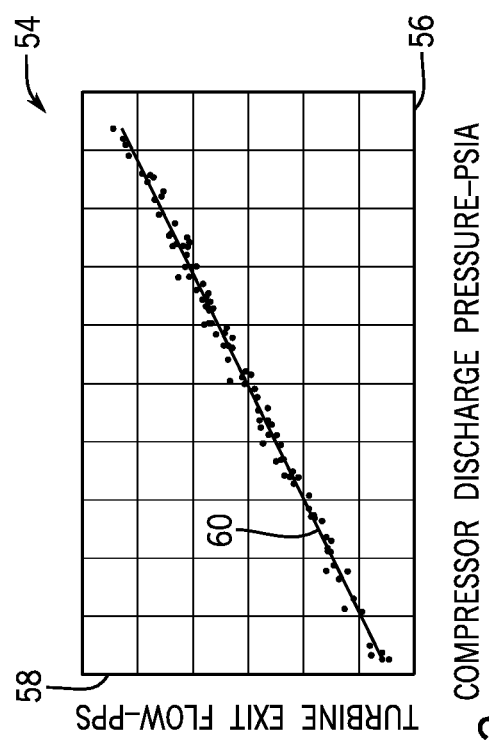
FIG. 3 is a graphical representation of turbine exit flow to compressor discharge pressure, in accordance with aspects of the present technique.
Figure 5:
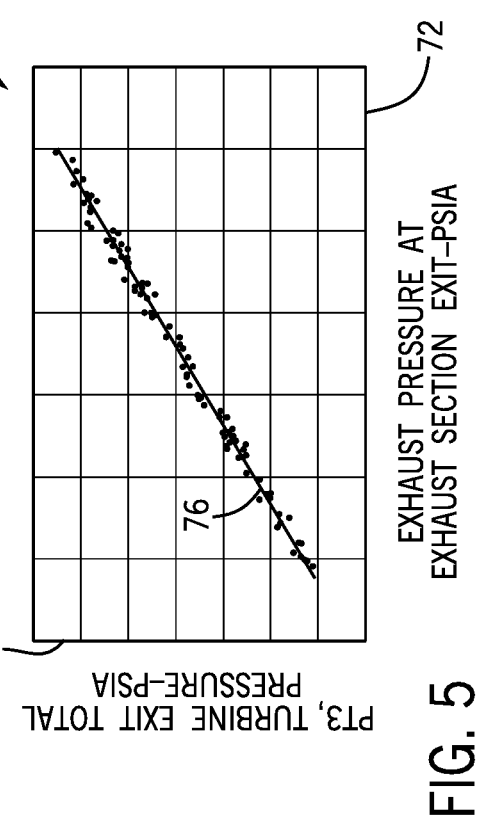
FIG. 5 is a graphical representation of turbine exit total pressure to exhaust pressure at exhaust section exit, in accordance with aspects of the present technique.
Figure 4:
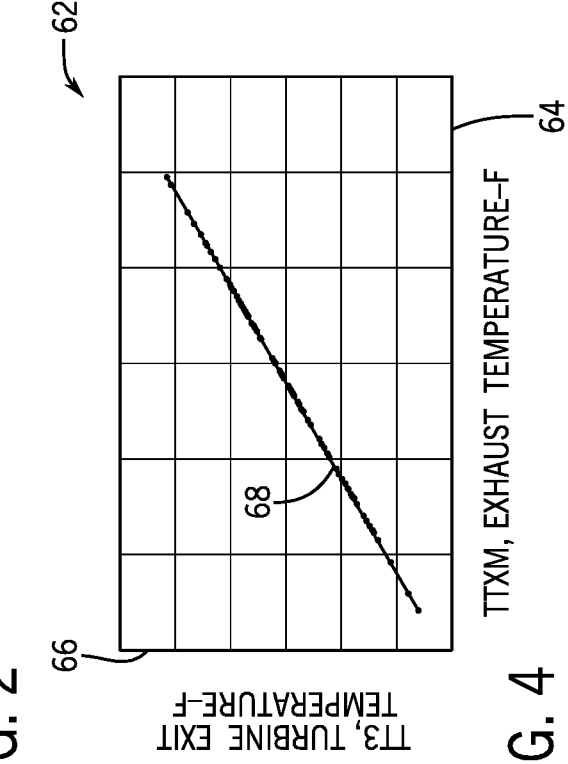
FIG. 4 is a graphical representation of turbine exit temperature to exhaust temperature, in accordance with aspects of the present technique.
Figure 6:
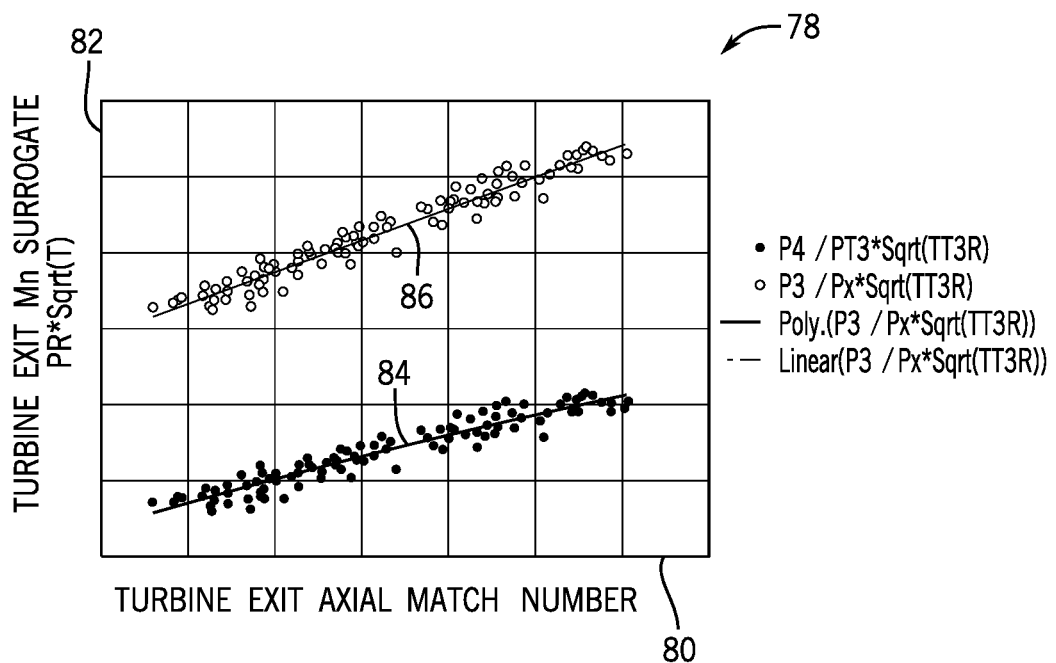
FIG. 6 is a graphical representation of turbine exit Mn surrogates (derived from components of a turbine exit flow function or measured parameters strongly correlated to the components of the turbine exit flow function) to turbine exit Mn, in accordance with aspects of the present technique.

Turbine exit flow, total pressure, and total temperature at the turbine exit are not readily measured or available. However, turbine exit flow, total pressure, and total temperature have strong correlations to control measured parameters as illustrated in FIGS. 3-5. It should be noted that in certain embodiments, other parameters and/or additional parameters to those in FIGS. 3-5 may be utilized in determining the turbine exit Mn surrogate. FIG. 3 is a graphical representation 54 of turbine exit flow to compressor discharge pressure. The graphical representation 54 includes an X-axis 56 representing compressor discharge pressure and a Y-axis 58 representing turbine exit flow. Since turbine exit flow is proportional to compressor inlet flow, there is a strong correlation between the turbine inlet pressure and compressor flow for a fixed design of compressor extractions and turbine first stage geometry. For a given combustion system, this can be extended to a show similarly strong proportionality between turbine inlet pressure and compressor discharge pressure. Plot 60 illustrates that the flow component or turbine exit flow has a strong correlation to the pressure at the compressor discharge. Thus, compressor discharge pressure (a measured parameter) may serve as a surrogate for turbine exit flow in calculating the turbine exit Mn surrogate.

FIG. 4 is a graphical representation of turbine exit temperature to exhaust temperature. The graphical representation 62 includes an X-axis 64 representing exhaust temperature and a Y-axis 66 representing turbine exit temperature (as measured in the exhaust section at a control exhaust temperature frame and adjusted for radial profile effects). Turbine exit total temperature is strongly related to a typical exhaust temperature measurement. They differ by the dilution effect of exhaust frame cooling introduced between the turbine exit and the control exhaust temperature measurement plane in the exhaust section. Plot 68 illustrates that the temperature component or turbine exit temperature has a strong correlation to the exhaust temperature as measured in the exhaust section. This is expected given that the exhaust temperature is the turbine exit temperature plus frame blower dilution. Thus, exhaust temperature (a measured parameter) may serve as a surrogate for turbine exit temperature in calculating the turbine exit Mn surrogate.

FIG. 5 is a graphical representation of turbine exit total pressure to exhaust pressure at exhaust section exit. The graphical representation 70 includes an X-axis 72 representing exhaust pressure at the exhaust section exit and a Y-axis 74 representing turbine exit total pressure. Turbine exit pressure is strongly related to the measured pressure at the exit of the exhaust section or exhaust diffuser section and correlated primarily by exhaust system pressure recovery. For a fixed design with the intended used of the surrogate over a limited range of turbine exit Mn conditions related to full load operation, variation in this pressure recovery will be fairly limited. These boundary conditions are related through the exhaust system pressure recovery and the range of interest will have limited variation in swirl angle and Mn. Plot 76 illustrates that the pressure component or turbine exit total pressure has a strong correlation to the exhaust pressure as measured at the exit of the exhaust section. Thus, exhaust pressure (a measured parameter) may serve as a surrogate for turbine exit total pressure in calculating the turbine exit Mn surrogate.

As noted above in FIG. 2, turbine exit flow function is strongly correlated to turbine exit Mn and may serve as turbine exit Mn surrogate in a non-MBC strategy. Thus, a turbine exit Mn surrogate may be based on turbine pressure times the square root of the turbine exit absolute temperature. FIG. 5 is a graphical representation 78 of turbine exit Mn surrogates (derived from components of a turbine exit flow function or measured parameters strongly correlated to the components of the turbine exit flow function) to turbine exit Mn. The graphical representation 78 includes an X-axis 80 representing turbine exit axial Mn and a Y-axis 82 representing turbine exit Mn surrogate (PR*Sqrt(T)), where PR equals pressure ratio and T equals temperature. Plot 84 represents the turbine exit Mn surrogate as calculated for the components of a turbine exit flow function (e.g., as gathered in a system that utilizes an MBC to derive the values for turbine exit total pressure ($P_{T3}$) and turbine exit absolute temperature ($T_{T3}$)) relative to turbine exit axial Mn. Plot 86 represents the turbine exit Mn surrogate as calculated utilizing measured parameters strongly correlated (and utilized as surrogates) to the components of the turbine exit flow function such as turbine exhaust temperature ($T_X$) as measured in the control exhaust temperature measurement plane in the exhaust section and the exhaust pressure ($P_X$) as measured at the exit of the exhaust section relative to turbine exit axial Mn. As depicted in the graphical representation 78, utilizing the surrogate measured parameters for the turbine exit Mn surrogate in plot 86 are as correlated to turbine exit axial Mn as utilizing the components of turbine exit flow function in plot 84. Thus, a turbine exit Mn surrogate derived from the following equation $(P_{CD}/P_X)*(T_{TXM\_R})$, where $P_{CD}$ represents the measured compressor discharge pressure and $T_{TXM\_R}$ represents the Rankine adjusted turbine exhaust temperature, is strongly related to turbine exit Mn and may provide a reasonable boundary control surrogate.

Figure 7:
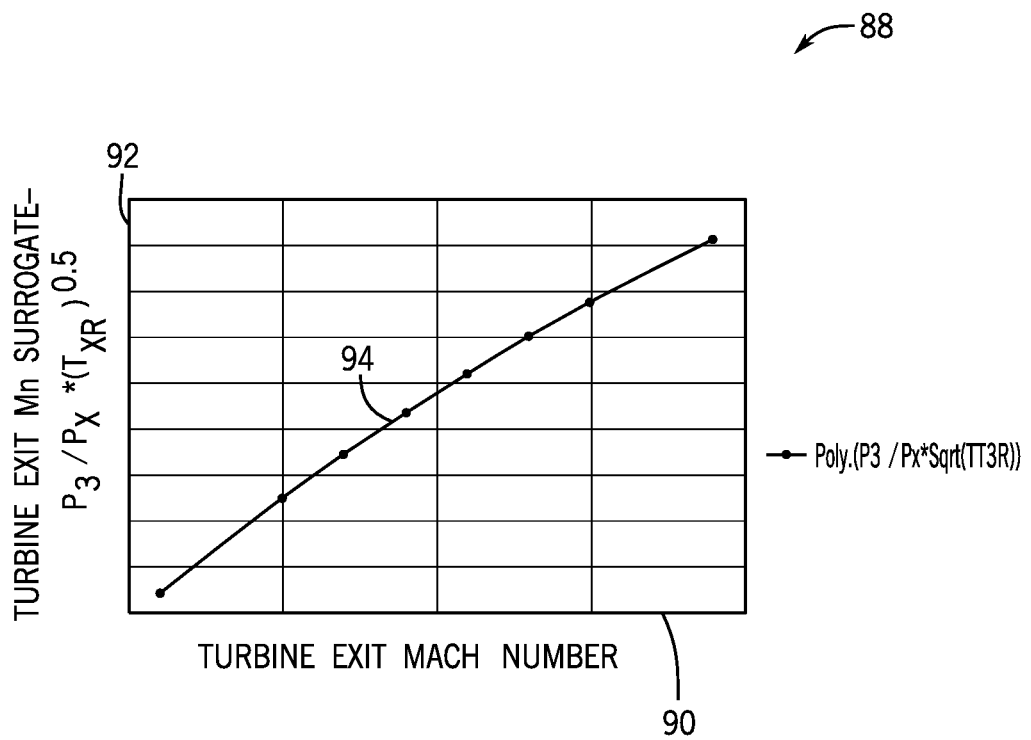
FIG. 7 is a graphical representation of turbine exit Mn surrogates (derived from measured parameters strongly correlated to components of a turbine exit flow function) to turbine exit Mn over multiple load sweeps, in accordance with aspects of the present technique.

FIG. 7 is a graphical representation 88 of turbine exit Mn surrogate (Y-axis 92) (derived from measured parameters strongly correlated to components of a turbine exit flow function) to turbine exit Mn (X-axis 90) over multiple load sweeps. The multiple load sweeps were conducted with a gas turbine system over based Mn sweeps at different ambient pressure conditions (e.g., ranging from 12.7 to 14.7 pound-force per square inch (psia) or approximately 87.6 to 101.4 Kilopascals (kPa) assuming normal cycle performance. In addition, the multiple load sweeps were conducted with the gas turbine system over different extreme cold ambient temperatures (e.g., ranging from −60 to −10° F. or approximately −51.1 to −12.2° C.) expected for turbine exit Mn control with nominal cycle performance and $T_{fire}$ suppression. Plot 94 illustrates that turbine exit Mn surrogate (derived from measured parameters strongly correlated to components of a turbine exit flow function) has a strong correlation to the turbine exit Mn.

Figure 8:
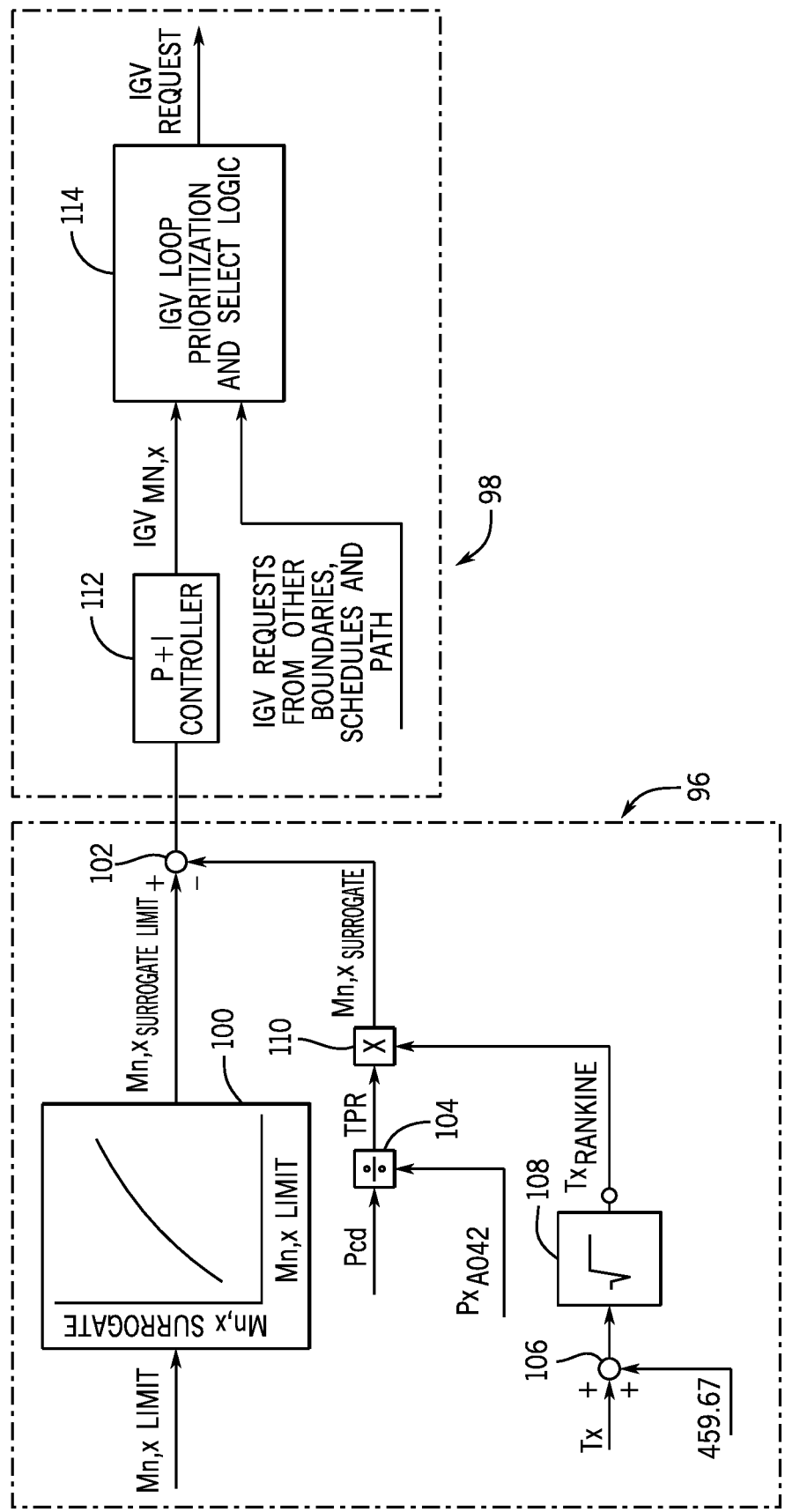
FIG. 8 is a functional block diagram of an embodiment for turbine exit Mn boundary control utilizing a turbine exit Mn surrogate, in accordance with aspects of the present technique.

FIG. 8 is a functional block diagram of an embodiment for turbine exit Mn boundary control utilizing a turbine exit Mn surrogate. Dashed section 96 represents control code for the surrogate turbine exit Mn and dashed section 98 represents control code for IGV con to Min, Max, and Path constraints. As depicted in the dashed section 96, a turbine exit Mn limit (Mn,x Limit) is provided to a control curve 100 or table (relating the turbine exit Mn surrogate (Mn,x surrogate) to the turbine exit Mn limit) to generate a turbine exit Mn surrogate limit ($Mn,x_{surrogate\ Limit}$). The turbine exit surrogate limit (which may be constant limit or a variable limit) is provided to a comparator 102. Also, as depicted in the dashed section 96, the measured compressor discharge pressure ($P_{cd}$) is divided (as indicated at reference numeral 104) by the measured exhaust pressure at the exit of the exhaust section to obtain the turbine pressure ratio (TPR). The turbine exhaust temperature ($T_X$) as measured in the control exhaust temperature measurement plane in the exhaust section is provided to a comparator 106 that adds the standard day temperature (e.g., 459.67) to provide an absolute turbine exit temperature. The square root (as indicated by reference numeral 108) of the output of the comparator 106 provides the Rankin turbine exhaust temperature ($T_{XRankine}$) which is multiplied (as indicated by reference numeral 110) by the TPR obtain the turbine exit Mn surrogate. The turbine exit Mn surrogate is provided to the comparator 102 along with the turbine exit surrogate limit to generate an output that is provided as an input to a controller (e.g., proportional integral controller) 112 in the dashed section 98. The controller provides a compressor IGV, closed loop max open effector constraint ($IGV_{Mn,x}$) derived from the turbine exit Mn surrogate to an IGV loop prioritization and select logic 114. In addition, other max open IGV constraints or IGV requests from other boundaries, schedules, and path (e.g., maximum compressor discharge temperature, compressor operability, aero constraints, mechanical limits, etc.) are provided to the IGV loop prioritization and select logic 114. The $IGV_{Mn,x}$ and the other max open IGV contraints go thru a priority select and the IGV loop prioritization and select logic 114 outputs an IGV setting or IGV request.

Figure 9:
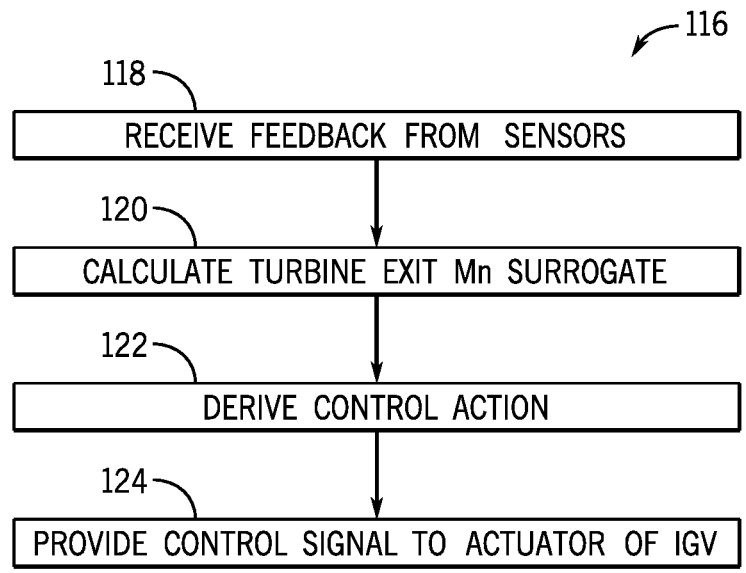
FIG. 9 is a flow diagram of a method for utilizing a turbine exit Mn surrogate for controlling a turbine engine system, in accordance with aspects of the present disclosure.

FIG. 9 is a flow diagram of a method 116 for utilizing a turbine exit Mn surrogate for controlling a turbine engine system. One or more steps of the method 116 may be performed by a controller of a gas turbine system (e.g., controller 38 in FIG. 1). The method 116 includes receiving feedback from sensors coupled to components of a gas turbine system (block 118). For example, feedback may be received from sensors coupled to a compressor or an exhaust section. The feedback may include measured parameters such as compressor discharge pressure, exhaust section exit pressure, and exhaust temperature (e.g., measured along a control exhaust temperature measurement plane in the exhaust section). The measured parameters correlate to (and serve as surrogates) to parameters related to turbine exit flow function that would otherwise be utilized to directly calculate the turbine exit Mn surrogate but that are not measured on the gas turbine system or are not available. The method 116 also includes calculating a surrogate value for the turbine exit Mn based on the feedback from the sensors (block 120). For example, the surrogate value for the turbine exit Mn may be calculated based on the measured compressor discharge pressure, exhaust section exit pressure, and exhaust temperature as described above. The surrogate value for the turbine exit Mn serves as boundary control for the gas turbine system. The method 116 further comprises utilizing the surrogate value for the turbine exit Mn to derive a control action for the gas turbine system (block 122). The control action is derived as described above in FIG. 8. The method 116 even further includes providing a control signal (based on the surrogate value) to an actuator coupled to the IGV within the compressor to control the actuator (block 124). The turbine exit Mn surrogate may be utilized in a non-MBC strategy. In certain embodiments, the turbine exit MN surrogate on gas turbine systems (e.g., legacy systems) that include MBC but lack MBC for turbine exit Mn.

Figure 10:
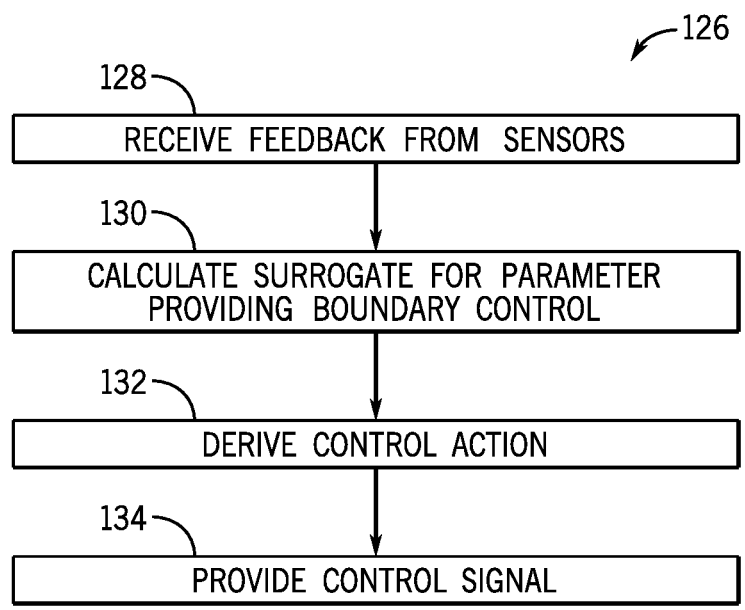
FIG. 10 is a flow diagram of a method for utilizing a surrogate for a parameter for direct boundary control for controlling a turbine engine system, in accordance with aspects of the present disclosure.

The non-MBC strategy for utilizing a surrogate for turbine exit Mn may also be utilized for other parameters that provide boundary control. FIG. 10 is a flow diagram of a method 126 for utilizing a surrogate for a parameter for direct boundary control for controlling a turbine engine system. One or more steps of the method 126 may be performed by a controller of a gas turbine system (e.g., controller 38 in FIG. 1). The method 126 includes receiving feedback from sensors coupled to components of a gas turbine system (block 128). For example, feedback may be received from sensors coupled to a compressor, a combustor, a turbine, an exhaust section, or other component of a gas turbine system. The measured parameters may correlate to (and serve as surrogates) to parameters related to a surrogate for a desired boundary control parameter that would otherwise be utilized to directly calculate the surrogate but that are not measured on the gas turbine system or are not available. The method 116 also includes calculating a surrogate value for the desired boundary control parameter based on the feedback from the sensors (block 130). The method 126 further comprises utilizing the surrogate value for the desired boundary control parameter to derive a control action for the gas turbine system (block 132). The method 126 even further includes providing a control signal (based on the surrogate value) to a component of the gas turbine system or an actuator coupled to the component to control the component or the actuator (block 134).

Technical effects of the disclosed embodiments include providing an accurate and robust (as well as easily constructed) turbine exit Mn surrogate that may be utilized for limit control on heavy duty gas turbines that do not have MBC control. In certain embodiments, the non-MBC strategy utilizing the turbine exit Mn surrogate may also be utilized on gas turbine systems that have an onboard model where the model lacks any provision for turbine exit Mn control. The utilization of the turbine exit Mn surrogate may enable hardware upgrades on gas turbine systems that are more cost effective than a full MBC upgrade to support the hardware upgrade. The turbine exit Mn surrogate is capable of regulating the operating point to a limiting turbine exit Mn at least as well as (if not better) than utilizing the actual turbine exit Mn in a MBC strategy. In particular, the turbine exit Mn surrogate is robust enough to handle variation in ambient conditions, exhaust system design pressure drop variation, component performance variation, and control sensor uncertainty.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Further aspects of the invention are provided by the subject matter of the following clauses:

1. A system, comprising: a gas turbine system comprising a compressor, combustor, a turbine, and an exhaust section; a plurality of sensors coupled to components of the gas turbine system; a controller communicatively coupled to the gas turbine system and the plurality of sensors and configured to control operations of the gas turbine system, wherein the controller is configured to calculate a surrogate value for turbine exit Mach number based on the feedback from the plurality of sensors and to utilize the surrogate value to derive a control action for the gas turbine system.

2. The system of clause 1, comprising an actuator coupled to an inlet guide vane within the compressor, and wherein the control action comprises controlling the actuator.

3. The system of any preceding clause, wherein the plurality of sensors are coupled to the compressor and the turbine.

4. The system of any preceding clause, wherein the feedback comprises measured parameters for compressor discharge pressure, exhaust section exit pressure, and exhaust temperature adjusted for radial profile effects.

5. The system of any preceding clause, wherein the measured parameters correlate to parameters related to turbine exit flow function that would otherwise be utilized to directly calculate the turbine exit Mach number but that are not measured on the gas turbine system.

6. The system of any preceding clause, wherein the parameters comprise a turbine exit flow, turbine exit pressure, and turbine exit absolute temperature.

7. The system of any preceding clause, wherein the surrogate value is configured to act as a boundary control for the gas turbine system.

8. A method, comprising: receiving, at a controller, feedback from a plurality of sensors coupled to components of a gas turbine system, the gas turbine system comprising a compressor, combustor, a turbine, and an exhaust section; calculating, via the controller, a surrogate value for turbine exit Mach number based on the feedback from the plurality of sensors; and utilizing, via the controller, the surrogate value to derive a control action for the gas turbine system.

9. The method of clause 8, comprising providing a control signal based on the surrogate valve to an actuator coupled to an inlet guide vane within the compressor to control the actuator.

10. The method of any preceding clause, wherein the plurality of sensors are coupled to the compressor and the turbine.

11. The method of any preceding clause, wherein the feedback comprises measured parameters for compressor discharge pressure, exhaust section exit pressure, and exhaust temperature adjusted for radial profile effects.

12. The method of any preceding clause, wherein the measured parameters correlate to parameters related to turbine exit flow function that would otherwise be utilized to directly calculate the turbine exit Mach number but that are not measured on the gas turbine system.

13. The method of any preceding clause, wherein the parameters comprise a turbine exit flow, turbine exit pressure, and turbine exit absolute temperature.

14. The method of any preceding clause, wherein the surrogate value acts as a boundary control for the gas turbine system.

15. A non-transitory computer-readable medium, the computer-readable medium comprising processor-executable code that when executed by a processor, causes the processor to: receive feedback from a plurality of sensors coupled to components of a gas turbine system, the gas turbine system comprising a compressor, combustor, a turbine, and an exhaust section; calculate a surrogate value for turbine exit Mach number based on the feedback from the plurality of sensors; and utilize the surrogate value to derive a control action for the gas turbine system, wherein the surrogate value acts as a boundary control for the gas turbine system.

16. The non-transitory computer-readable medium of clause 15, wherein the processor-executable code, when executed by the processor, causes the processor to provide a control signal based on the surrogate valve to an actuator coupled to an inlet guide vane within the compressor to control the actuator.

17. The non-transitory computer-readable of any preceding clause, wherein the plurality of sensors are coupled to the compressor and the turbine.

18. The non-transitory computer-readable of any preceding clause, wherein the feedback comprises measured parameters for compressor discharge pressure, exhaust section exit pressure, and exhaust temperature adjusted for radial profile effects.

19. The non-transitory computer-readable of any preceding clause, wherein the measured parameters correlate to parameters related to turbine exit flow function that would otherwise be utilized to directly calculate the turbine exit Mach number but that are not measured on the gas turbine system.

20. The non-transitory computer-readable of any preceding clause, wherein the parameters comprise a turbine exit flow, turbine exit pressure, and turbine exit absolute temperature.

The invention claimed is:
1. A system, comprising:
a gas turbine system comprising a compressor, a combustor, a turbine, and an exhaust section;
a plurality of sensors coupled to components of the gas turbine system; and a controller communicatively coupled to the gas turbine system and the plurality of sensors and configured to control operations of the gas turbine system, wherein the controller is configured to calculate a surrogate value for turbine exit Mach number based on the feedback from the plurality of sensors and to utilize the surrogate value for the turbine exit Mach number to derive a control action for the gas turbine system, and wherein the feedback comprises measured parameters that positively correlate to parameters related to turbine exit flow function that would otherwise be utilized to directly calculate the turbine exit Mach number but that are not measured on the gas turbine system, wherein the surrogate value for the turbine exit Mach number comprises a pressure ratio times a square root of temperature.

2. The system of claim 1, comprising an actuator coupled to an inlet guide vane within the compressor, and wherein the control action comprises controlling the actuator.

3. The system of claim 1, wherein the plurality of sensors are coupled to the compressor and the turbine.

4. The system of claim 3, wherein the measured parameters comprise compressor discharge pressure, exhaust section exit pressure, and exhaust temperature adjusted for radial profile effects.

5. The system of claim 1, wherein the parameters comprise a turbine exit flow, turbine exit pressure, and turbine exit absolute temperature.

6. The system of claim 1, wherein the surrogate value for the turbine exit Mach number is configured to act as a boundary control for the gas turbine system.

7. A method, comprising:
receiving, at a controller, feedback from a plurality of sensors coupled to components of a gas turbine system, the gas turbine system comprising a compressor, combustor, a turbine, and an exhaust section;
calculating, via the controller, a surrogate value for turbine exit Mach number based on the feedback from the plurality of sensors, wherein the feedback comprises measured parameters that positively correlate to parameters related to turbine exit flow function that would otherwise be utilized to directly calculate the turbine exit Mach number but that are not measured on the gas turbine system; and
utilizing, via the controller, the surrogate value for the turbine exit Mach number to derive a control action for the gas turbine system, wherein the surrogate value for the turbine exit Mach number comprises a pressure ratio times a square root of temperature.

8. The method of claim 7, comprising providing a control signal based on the surrogate value for the turbine exit Mach number to an actuator coupled to an inlet guide vane within the compressor to control the actuator.

9. The method of claim 7, wherein the plurality of sensors are coupled to the compressor and the turbine.

10. The method of claim 9, wherein the measured parameters comprise compressor discharge pressure, exhaust section exit pressure, and exhaust temperature adjusted for radial profile effects.

11. The method of claim 7, wherein the parameters comprise a turbine exit flow, turbine exit pressure, and turbine exit absolute temperature.

12. The method of claim 7, wherein the surrogate value for the turbine exit Mach number acts as a boundary control for the gas turbine system.

13. A non-transitory computer-readable medium, the computer-readable medium comprising processor-executable code that when executed by a processor, causes the processor to:
receive feedback from a plurality of sensors coupled to components of a gas turbine system, the gas turbine system comprising a compressor, combustor, a turbine, and an exhaust section;
calculate a surrogate value for turbine exit Mach number based on the feedback from the plurality of sensors, wherein the feedback comprises measured parameters that positively correlate to parameters related to turbine exit flow function that would otherwise be utilized to directly calculate the turbine exit Mach number but that are not measured on the gas turbine system; and
utilize the surrogate value for the turbine exit Mach number to derive a control action for the gas turbine system, wherein the surrogate value for the turbine exit Mach number acts as a boundary control for the gas turbine system, wherein the surrogate value for the turbine exit Mach number comprises a pressure ratio times a square root of temperature.

14. The non-transitory computer-readable medium of claim 13, wherein the processor-executable code, when executed by the processor, causes the processor to provide a control signal based on the surrogate valve for the turbine exit Mach number to an actuator coupled to an inlet guide vane within the compressor to control the actuator.

15. The non-transitory computer-readable of claim 13, wherein the plurality of sensors are coupled to the compressor and the turbine.

16. The non-transitory computer-readable of claim 15, wherein the measured parameters comprise compressor discharge pressure, exhaust section exit pressure, and exhaust temperature adjusted for radial profile effects.

17. The non-transitory computer-readable of claim 13, wherein the parameters comprise a turbine exit flow, turbine exit pressure, and turbine exit absolute temperature.

* * * * *